United States Patent [19]

Armstrong

[11] Patent Number: 4,490,078

[45] Date of Patent: Dec. 25, 1984

[54] GRAVEL INJECTION APPARATUS

[76] Inventor: A. L. Armstrong, Rte. 4, Box 306, Alvin, Tex. 77511

[21] Appl. No.: 389,444

[22] Filed: Jun. 17, 1982

[51] Int. Cl.³ .............................................. B65G 53/40
[52] U.S. Cl. ................................... 406/114; 134/100; 406/142; 406/146
[58] Field of Search ................................ 406/113–116, 406/136, 142, 146; 422/261, 283; 134/100, 101, 102, 182

[56] References Cited

U.S. PATENT DOCUMENTS

| | | | |
|---|---|---|---|
| 2,788,008 | 4/1957 | Wanzer | 134/101 |
| 3,093,420 | 6/1963 | Levene et al. | 406/142 X |
| 4,029,364 | 6/1977 | Salzer | 406/115 |

FOREIGN PATENT DOCUMENTS

| | | | |
|---|---|---|---|
| 874283 | 6/1971 | Canada | 406/146 |
| 538231 | 12/1977 | U.S.S.R. | 406/142 |

Primary Examiner—Jeffrey V. Nase
Attorney, Agent, or Firm—Guy E. Matthews

[57] ABSTRACT

Disclosed is an apparatus and system for forming a slurry of gravel and fluid, preferably for injection into an oil and gas well during gravel packing operations. The apparatus includes a pressure vessel that is adapted to receive the gravel. The pressure vessel has an inlet for receiving fluid. The apparatus includes a snorkel tube that is slidingly sealingly mounted for movement into and out of the pressure vessel. The snorkel tube has an open inner end which defines the outlet of the pressure vessel and an outer end which is connected to a conduit, which is in turn is connected to the well. The pressure vessel and snorkel tube are arranged such that fluid flows in a tortuous path between the pressure vessel inlet and the inner end of the snorkel tube to entrained gravel in the flowing fluid.

1 Claim, 2 Drawing Figures

GRAVEL INJECTION APPARATUS

BACKGROUND OF THE INVENTION

A. Field of the Invention

This invention relates generally to particulate material transferring systems, and more particularly to a system for injecting gravel into a fluid carrying flow line for use in gravel or sand packing operations.

B. Description of the Prior Art

A common problem encountered in oil and gas production is the control of particles from unconsolidated and disintegrating formations so that they may not enter the well. Such control diminishes the destructive influence of the sand scouring on well equipment and tends to reduce maintenance cost. Also, such control makes equipment and well clean out operations less frequent, thereby enabling the well to produce for a greater period of time than would otherwise be the case.

One method for controlling such unconsolidated and disintegrating material is known as gravel or sand packing which involves surrounding the tubing through the producing formation with a filter bed of gravel or coarse sand. In industry usage, gravel has particle sizes in the range of 4 to 10 or 14 mesh and sand has particles ranging in size from 20 to 40 mesh. However, for purposes hereof and as used herein, the packing medium shall be referred to as gravel, which shall include both gravel and sand.

One common method for gravel packing is by circulation, in which a slurry is forced of gravel and a fluid, such as oil or light weight drilling fluid. The slurry is circulated into the production zone either normally or reversed where the gravel is deposited. The circulating fluid is returned to the surface either through the annulus, or through the tubing in case of reverse circulation. An example of a method of sand packing is disclosed in U.S. Pat. No. 2,952,318.

A problem in gravel packing is in the preparation of the gravel and fluid slurry. Typically, the gravel is poured into the fluid in a tank and then the contents of the tank are sucked through the inlet of a pump and discharged into the well. Such a method leads to an inconsistent slurry which at times has too high a concentration of gravel and at other times too low. Additionally, the relatively large abrasive gravel particles cause wear in the pump, which leads to premature pump failures.

Accordingly, it is an object of the present invention to overcome the shortcomings of the prior art. More specifically, it is an object of the present invention to provide an apparatus and system for forming a uniform gravel and fluid slurry. It is a further object of the present invention to provide an apparatus and system which is capable of producing a gravel and fluid slurry wherein the relative proportions of gravel and fluid may be controlled and varied, thereby to optimize gravel packing. It is a further object of the present to provide an apparatus and system which is adapted to inject a gravel and fluid slurry into a well without running the slurry through a pump.

SUMMARY OF THE INVENTION

Briefly stated, the foregoing and other objects are accomplished by the gravel injector apparatus and system of the present invention. The gravel injector apparatus of the present invention includes a pressure vessel which is adapted to receive gravel. The pressure vessel has an inlet through which the circulating fluid is introduced into the pressure vessel. The outlet of the pressure vessel includes a snorkel tube sealingly slidingly mounted for movement into and out of the pressure vessel. The snorkel tube has an open inner end which is inside the pressure vessel and an outer end which is outside the pressure vessel and connected for fluid communication to the well. The inner end of the snorkel tube is initially positioned near the top of the pressure vessel. As fluid flows through the pressure vessel from the inlet to the inner end of the snorkel tube, gravel is entrained in the flowing fluid and carried out of the pressure vessel through the snorkel tube. As gravel is carried out of the pressure vessel, the snorkel tube is advanced into the pressure vessel. The rate of advance of the snorkel tube into the pressure vessel controls the relative proportions of gravel and fluid in the slurry. The faster the snorkel tube is advanced, the more gravel concentrated is the slurry.

DESCRIPTION OF THE PREFERRED EMBODIMENT

Figure 1:
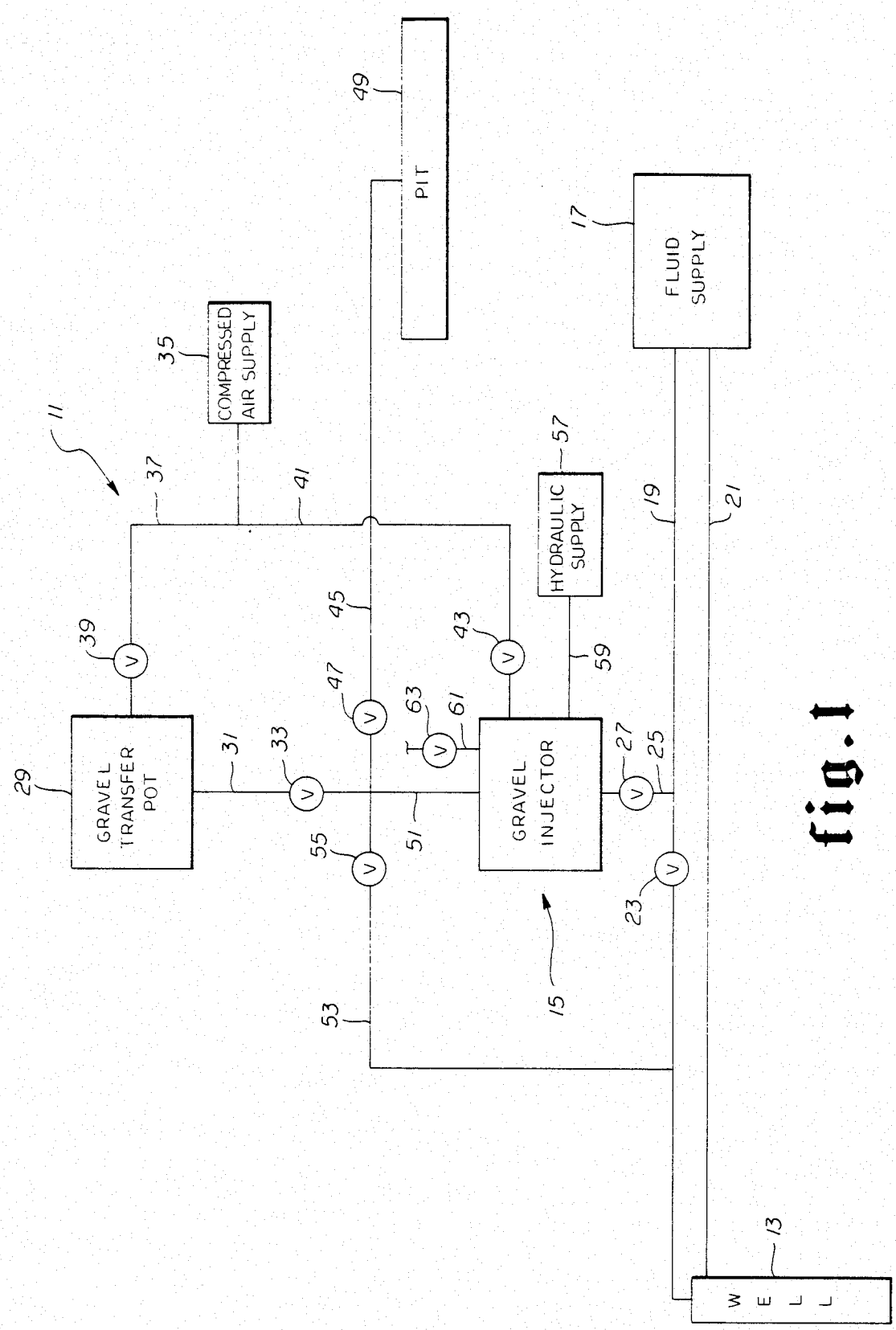
FIG. 1 is a schematic representation of the system of the present invention.

Referring now to the drawings, and first to FIG. 1, the gravel injection system of the present invention is designated generally by the numeral 11. Gravel injection system 11 is adapted to supply a slurry of gravel and a circulating fluid to a well, shown schematically at 13. Gravel injection system 11 includes a gravel injector, designated generally by the numeral 15, which will be described in detail hereafter. A fluid supply shown schematically at 17 is provided for circulating the fluid into and out of well 13. Fluid supply 17 generally includes tanks and pumps. The fluid is delivered to well 13 through a conduit 19 and returned through a conduit 21.

A valve 23 is included in conduit 19 and allows fluid to be diverted to gravel injector 15 through a branch conduit 25, as will be described in detail hereafter. A valve 27 is included in branch conduit 25 for controlling the flow of fluid into gravel injector 15.

Gravel injector system 11 further includes a gravel transfer pot 29 which is adapted to hold a supply of gravel for delivery to gravel injector 15 through a conduit 31. A valve 33 is included in conduit 31 for controlling the supply of gravel to gravel injector 15. A compressed air supply 35 is provided for supplying compressed air through a conduit 37 to gravel transfer pot 29 to blow the gravel into gravel injector 15. A valve 39 is included in conduit 37 for controlling the flow of air into gravel transfer pot 29.

Compressed air supply 35 communicates with a second conduit 41 for providing blow-down air to gravel injector 15. A valve 43 is included in conduit 41 for controlling the supply of blow-down air to gravel injector 15. A blow-down conduit 45, which includes a valve 47, is provided to communicate between gravel injector 15 and a pit 49. Blow-down fluid from gravel injector 15 flows through blow-down conduit 45 to pit 49.

Gravel injector 15 has an outlet conduit 51 which communicates with gravel transfer conduit 31 and blow-down conduit 45. Outlet conduit 51 also communicates with a slurry conduit 53 which is connected for fluid communication with fluid supply conduit 19. Slurry conduit 53 includes a valve 55, which is adapted to control the flow of slurry from gravel injector 15 to well 13.

Gravel injection system 11 also includes a hydraulic supply 57 which is adapted to supply hydraulic fluid through a conduit 59 to gravel injector 15. The function of hydraulic supply 57 will be described in detail hereafter. Gravel injector 15 also includes a vent conduit 61 which includes a valve 63.

Figure 2:
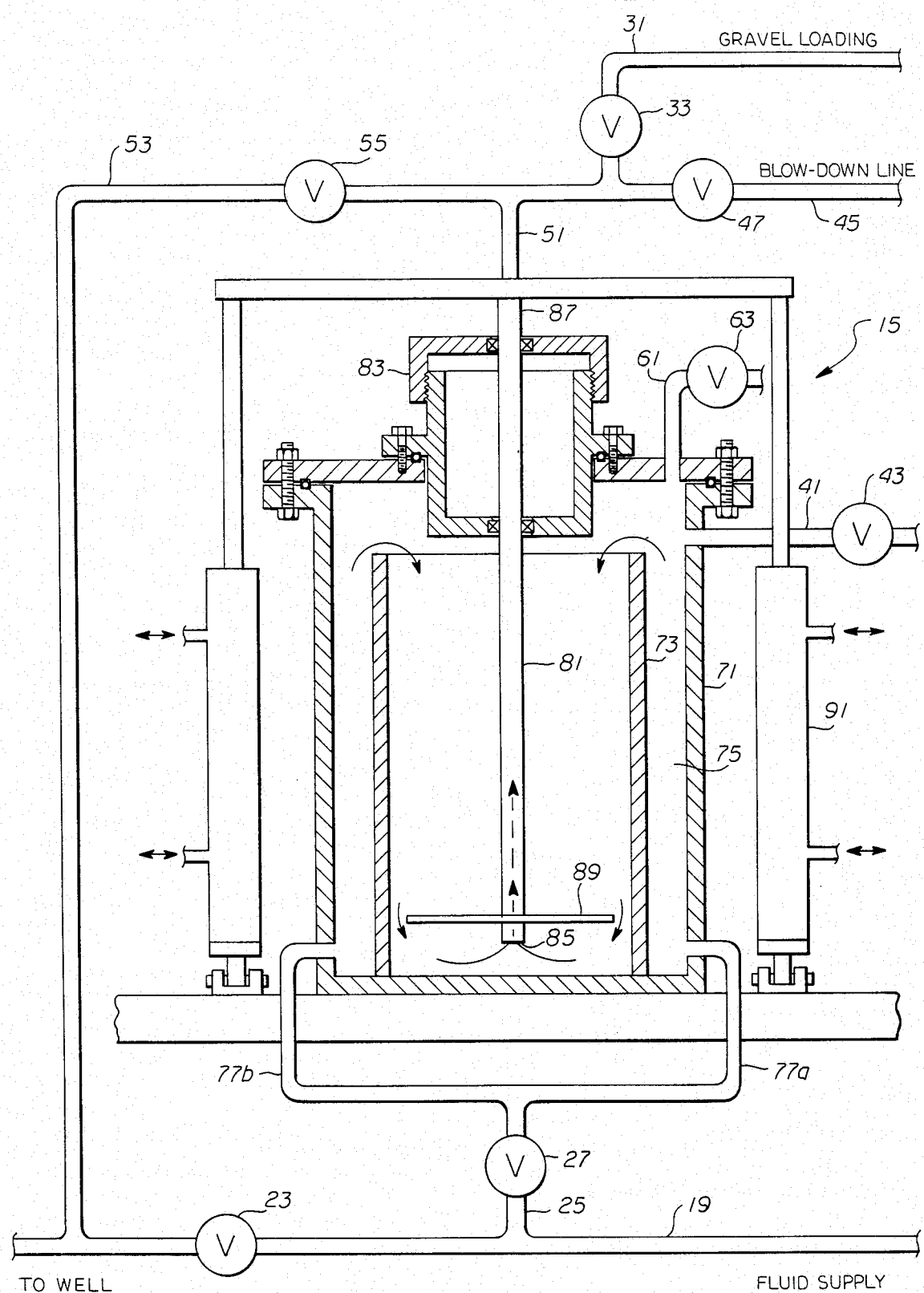
FIG. 2 is a partial schematic sectional view of the gravel injector apparatus of the present invention.

Referring now to FIG. 2, gravel injector 15 includes a pressure vessel 71, which in the preferred embodiment is a cylindrical enclosed tank. Within pressure vessel 71 there is a gravel container 73. In the preferred embodiment, gravel container 73 is an open topped cylinder concentric with and having a common bottom with pressure vessel 71. The wall of gravel container 73 is spaced apart from the inside wall of pressure vessel 71 to define an annular flow area 75. Conduit 25, which communicates with fluid supply conduit 19, supplies fluid to annular flow area 75 through a branched set of inlet conduits 77a and 77b.

Gravel injector 15 includes a snorkel tube 81, which is slidingly sealingly mounted for movement into and out of pressure vessel 71 through a stuffing box 83. The snorkel tube 81 has an open inner end 85, which defines the outlet of pressure vessel 71. Snorkel tube 81 also includes an outer end 87 which is connected to and communicates with outlet conduit 51. Snorkel tube 81 has connected thereto adjacent inner end 85 a circular baffle plate 89, which extends outwardly from snorkel tube 81 towards gravel container 73. Fluid thus flows through pressure vessel 71 in a tortuous path up annular space 75, over the top of gravel container 73 and downwardly to inner end 85 of snorkel tube 81 around baffle plate 89, as shown generally by the flow arrows.

Snorkel tube 81 is moved into and out of pressure vessel 71 by a set of hydraulic actuator assemblies, including hydraulic actuator assembly 91. Hydraulic actuator assembly 91 is supplied with hydraulic fluid by hydraulic supply 57. Snorkel tube 81 is thus movable within pressure vessel 71 and gravel container 73 between a position wherein inner end 85 is adjacent the bottom of gravel container 73, as shown in FIG. 2, and a position wherein inner end 85 of snorkel tube 81 is adjacent the top of gravel container 73, which position is not shown.

The operation of gravel injection system 11 may be best understood by referring both to FIGS. 1 and 2. Initially, circulation is established between fluid supply 17 and well 13 with valve 23 opened and valve 27 closed. Hydraulic actuator assembly 91 is operated to raise snorkel tube 81 to the positioned such that inner end 85 is adjacent the top of gravel container 73. With valves 55 and 47 closed, valve 33 is opened to allow for transfer of gravel from gravel transfer pot 29 through gravel transfer conduit 31 to snorkel tube 81. A sufficient amount of gravel is delivered in such manner as to substantially fill gravel container 73. During the filling operation, valve 63 is opened to vent the air within pressure vessel 71 displaced by the gravel. When gravel container 73 is substantially completely filled, valve 33 is closed.

In order to inject the gravel and fluid slurry into well 13, valve 55 is opened and valves 33, 43, 47, and 63, are closed. Valve 23 is then closed and valve 27 is opened thereby to established fluid flow through pressure vessel 71 and slurry conduit 53 to well 13. The tortuous flow of fluid across the bottom of baffle plate 89 and into inner end 85 of snorkel tube 81 and entrains gravel to form a slurry. As the gravel is entrained, snorkel tube 81 is advanced into pressure vessel 71 and gravel container 73 by the action of hydraulic actuator 91. The faster snorkel tube 81 is advanced, the greater the relative concentration of gravel in the slurry. When snorkel tube 81 is fully advanced into pressure vessel 71 and gravel container 73, such that inner end 85 of snorkel tube 81 is adjacent the bottom of gravel container 73, gravel container 73 is emptied. When gravel container 73 is so emptied, valves 27 and 55 are closed and valve 23 is opened thereby to re-established normal circulation.

After gravel container 73 has been emptied of gravel and circulation has been re-established, in the manner described, gravel container 73 is emptied of fluid by opening valves 43 and 47, and injecting compressed air into pressure vessel 71 through conduit 41. The compressed air forces fluid through inner end 85 of snorkel tube 81 and out blow-down line 45 to pit 49. When gravel container 73 is emptied of fluid, valves 47 and 43 are closed and hydraulic actuator 91 is operated to raise snorkel tube 81 to the raised position whereupon the gravel filling and slurry injection steps are repeated.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings and to be interpreted as illustrative and not in a limiting sense.

What is claimed is:

1. An apparatus for injecting gravel into a fluid carrying flow line to form a uniform gravel and fluid slurry for use in gravel and sand packing operations, said apparatus comprising:

(a) a pressure vessel adapted to receive said gravel, said pressure vessel including a gravel container means appropriately positioned therewithin having an enclosure with an open top;

(b) a snorkel tube sealingly slidingly mounted for movement into and out of said pressure vessel, said snorkel tube including an open inner end within said pressure vessel and an outer end exterior of said pressure vessel and communicating with said flow line, and having a baffle top attached thereto adjacent said open inner end and extending outwardly therefrom towards said enclosure;

(c) means for supplying fluid to said pressure vessel, said means being positioned to supply fluid to said pressure vessel exterior of said enclosure such that said fluid flows about the exterior of said enclosure, and through said top in a tortious path toward said open inner end of said snorkel tube;

(d) means for moving said snorkel tube into and out of said pressure vessel, said moving means including a hydraulic actuator assembly connected to said snorkel tube;

(e) means for removing fluid from said pressure vessel after said pressure vessel is emptied of gravel, said fluid removing means including a blow-down line connected to said snorkel tube, and means for supplying gas to said pressure vessel; and, (f) means for venting gas displaced from said pressure vessel when said gravel is introduced therein.

* * * * *